United States Patent Office

3,352,935
DEHYDROHALOGENATION PROCESS
John E. Mahan, Robert E. Reusser, and Carl W. Kruse, Bartlesville, Okla., assignors to Phillips Petroleum Company, a corporation of Delaware
No Drawing. Filed Apr. 20, 1964, Ser. No. 361,274
14 Claims. (Cl. 260—677)

This invention relates to a process for the dehydrohalogenation of alkyl halides. In another aspect, this invention relates to a process for the dehydrohalogenation of alkyl halides employing a novel catalyst to produce olefins wherein the formation of branched chain olefins through isomerization is minimized.

Currently considerable interest and much research effort have been devoted to the production of biodegradable detergents. A proposed method comprises halogenating normal paraffins, dehydrohalogenating the resulting alkyl halides to produce olfins, alkylating benzene or other aromatics with these olefins in the presence of HF, and subsequently sulfonating the product alkylate to produce a biodegradable detergent. These produced alkyl benzene sulfonates are rapidly degraded by bacteria because of the lack of branching of the substituent alkyl groups.

It has been observed that in the production of olefins by the dehydrohalogenation of the alkyl halides employing conventional dehydrohalogenation process conditions and catalysts, isomerization of the carbon skeleton of the produced olefins is the result. While for some uses this is not damaging, branched olefins are of little value when it is desired to form biodegradable detergents via alkylation for reasons previously stated.

Accordingly, an object of our invention is to provide an improved process for the dehydrohalogenation of alkyl halides.

Another object of our invention is to provide a process for the dehydrohalogenation of straight chain alkyl halides to produce straight chain olefins.

Another object of our invention is to provide a process for the dehydrohalogenation of alkyl halides to produce olefins wherein the formation of branched chain olefins through isomerization is minimized.

Another object of our invention is to provide an improved dehydrohalogenation catalyst.

Other objects, advantages and features of our invention will be readily apparent to those skilled in the art from the following description and the appended claims.

We have discovered that in the dehydrohalogenation of alkyl halides to olefins employing an oxidized charcoal dehydrohalogenation catalyst, the formation of branched chain olefins through isomerization is minimized by the addition of a finite amount of potassium compound to the charcoal catalyst.

The oxidized charcoal dehydrohalogenation catalyst of our invention can be prepared by a process such as described in copending application Serial No. 207,080, by C. W. Kruse and G. C. Ray, filed July 2, 1962. According to that application, activated charcoal is converted to an active dehydrohalogenation catalyst by oxidation at high temperatures, e.g., 500–700° C.

The charcoal portion of the potassium-containing charcoal catalyst of our invention, prior to oxidation, is a conventionally activated charcoal such as prepared from such sources as bagasse, bones, coconut shells, corncobs, cottonseed hulls, fruit pits, lignin, lignite, nut shells, peat, petroleum coke, sawdust, and the like. After initial carbonization, such as by heating in the absence of air at about 600° C., the charred material is then activated by such means as continued heat treating, treatment at elevated temperatures with carbon dioxide, steam, chlorine, sulfur dioxide, etc. By activation, the surface area of the charcoal is extended.

The dehydrohalogenation catalysts of our invention are prepared by subjecting an activated charcoal to an oxidizing treatment, said treatment being either prior to or subsequent to incorporation of a potassium compound in the charcoal. The oxidation or oxidizing treatment is carried out by heating the charcoal in air to a temperature above about 300° C., preferably to a temperature in the range of from 500 to 700° C. At these temperatures, the time of treatment will vary between about 1 second to about 1 hour, but will generally be from about 1 to 15 minutes. Some minor loss of carbon usually takes place during the oxidation step. If desired, the air employed for the oxidizing treatment may be diluted with inert gases to better control the treatment and to minimize combustion losses.

As previously noted, the potassium compound can be added to the charcoal either before or after the oxidizing treatment. While any potassium compound can be utilized, it is preferred to use inorganic potassium compounds such as potassium hydroxide and the potassium salts of strong acids. Typical potassium compounds which can be employed are potassium hydroxide, potassium chloride, potassium bromide, potassium nitrate, and the like.

The quantity of potassium compound which is added to the charcoal can vary over a wide range, but the amount of potassium compound present in the charcoal will generally range from about 0.5 to 25 weight percent of the potassium compound-containing charcoal catalyst. The potassium compound can be conveniently added to the charcoal by impregnating the charcoal with a solution of the potassium compound in a suitable solvent such as water. The wetted charcoal can then be dried, and employed in the dehydrohalogenation process if previously oxidized, or oxidation of the wetted charcoal can then be conducted. The particle size of the potassium-containing oxidized charcoal will vary over a wide range. Particles smaller than 325 mesh (U.S. series) are useful, as are granules of 6 mesh or larger and granules ranging from 325 to 6 mesh. Granular material is favored for continuous fixed bed type dehydrohalogenation process reactions.

The alkyl halides employed in the dehydrohalogenation process are alkyl halides, generally containing from 4 to 18 carbon atoms per molecule. The alkyl halides can be chlorides, iodides, bromides, fluorides, or mixtures thereof. However, the invention is particularly applicable to the dehydrohalogenation of alkyl chlorides.

The catalysts of our invention are suitable for the dehydrohalogenation of halogenated alkanes, including mono- and polyhalosubstituted alkanes of the straight chain and branched chain type. However, as previously noted, the invention is particularly applicable to the dehydrohalogenation of straight chain alkyl halides to produce straight chain olefins. Suitabls examples of $C_4$ to $C_{18}$ alkyl halides which can be converted to olefins by the process of our invention are 1-chlorobutane, 2-bromopentane, 3-iodooctane, 2-fluorononane, 1-chlorodecane, 1-chlorododecane, 1-bromooctadecane, 1,4-dichlorobutene, 1,3-dichlorohexane, 2,5-dibromooctene, 4,7-dibromooctadecane, 1,3,5-trichlorodecane, 1,3,4,7-tetrachlorotetradecane, and the like.

The dehydrohalogenation process is conducted at a temperature of from about 125 to about 500° C. These catalysts are suitable for the dehydrohalogenation of tertiary alkyl halides at temperatures of from about 125 to 200° C. Secondary alkyl halides are dehydrohalogenated selectively in the presence of primary halides at temperatures in the range of 225 to 300° C. Maximum production of straight chain olefins from primary halides is effected at temperatures in the range of 300 to 500° C.

The dehydrohalogenation process can be conducted as a batch or continuous process, utilizing either liquid phase or vapor phase operation. A preferred method of operation is to pass the volatilized alkyl halide through a bed of the potassium-containing catalyst of our invention at a rate chosen to provide the desired degree of conversion. Unconverted material can be separated from the reaction zone effluent by conventional separation methods and recycled to the reaction zone.

In batch operation, the catalyst concentration can range from about 0.01 to about 25 weight percent of the alkyl halide feed. In continuous operation, the liquid hourly space velocity can range from about 0.01 to about 10 volumes of alkyl halide feed per volume of catalyst per hour. Carrier gas inert to the dehydrohalogenation process can also be employed to assist the flow of products and by-products within the reaction system. Furthermore, as activity of the catalyst decreases, operation at successively higher temperatures can be employed until regeneration of the catalyst is required.

When the dehydrohalogenation process is conducted in the liquid phase, the dehydrohalogenation zone liquid effluent can be passed to a first distillation zone wherein dissolved hydrogen halide is separated from the liquid effluent. The liquid fraction comprising product olefin and unconverted alkyl halides can be passed from the first distillation zone to a second distillation zone wherein the product olefins are separated from the unconverted alkyl halides. The separated alkyl halides can then be recycled to the dehydrohalogenation zone.

When the dehydrohalogenation process is conducted in the vapor phase, the dehydrohalogenation zone vapor effluent can be partially condensed to separate the hydrogen halide therefrom and the condensed liquid fraction passed to a distillation zone wherein the product olefins are separated from the unconverted alkyl halides.

The following specific example is presented to illustrate the invention and to clearly indicate the lessened isomerization activity of the inventive dehydrohalogenation catalyst. However, it is not intended that the invention should be limited to the features shown therein.

*Example*

A series of runs was conducted in which potassium-promoted oxidized charcoal catalysts were compared with a non-promoted oxidized charcoal catalyst in the dehydrochlorination of straight chain dodecyl chlorides. In each run the charcoal was oxidized, and in the case of the promoted charcoal, the oxidation step was conducted either prior to or subsequent to the impregnation with a potassium compound.

The oxidation of the activated charcoal was conducted by placing a weighed sample of the charcoal in a quartz tray which had been preheated to 650 to 700° C. in a muffle furnace. The tray was then placed in a muffle furnace operating at 650 to 700° C., and the tray rapidly shaken while blowing air over the glowing charcoal. After about 5 minutes of such treatment, the tray was set out to cool and reweighed.

The oxidized activated charcoals were then employed for the dehydrochlorination of a mixture of primary and secondary dodecyl chlorides, principally secondary chlorides, formed by chlorination of n-dodecane. The runs were conducted in a 12 ml. quartz catalyst tube to which the charcoal catalyst was charged. The quartz tube was mounted inside a refractory tube which contained electric heating elements and the entire arrangement surrounded by ½-inch asbestos insulation.

In each run nitrogen was metered into the dehydrohalogenation reactor at a pressure of 5 p.s.i.g. and a flow rate of 2.4 liters per hour. The reactor was heated by means of electric heaters to 300° C. and after the reactor was stabilized at 300° C., the dodecyl chlorides were charged at a space velocity of 0.6 (LHSV) through a 6-inch hypodermic needle. These conditions were maintained for 30 minutes to establish equilibrium after which a 1-hour sample was collected. The reactor temperature was then increased to 350° C. and held there for a 30-minute stabilization period (at the same feed rate) prior to obtaining a second 1-hour sample. This procedure was again repeated at 400° C.

Conversions obtained in the dehydrohalogenation reaction were determined by chromatographic analysis on a 10-foot by ¼-inch diameter column packed with glass beads coated with di(n-decyl) phthalate. The liquid effluent was weighed and the dissolved HCl removed by placing the collected effluent in an oven at 80° C. and 20 mm. Hg absolute pressure for 30 minutes. The stripped liquid was then analyzed for chlorine content and for branched hydrocarbon content. The quantity of branched hydrocarbons formed by isomerization during dehydrohalogenation was determined by gas-liquid chromatography.

The results obtained during the runs are shown below in Table I. The charcoal employed in each of these runs was petroleum base coke (Darco). In a typical run employing impregnation of the activated charcoal, 20 grams of the charcoal was wetted with 25 ml. of 10 percent by weight aqueous potassium hydroxide. The mixture was placed under vacuum for 10 minutes to insure thorough impregnation, following which the excess fluid was filtered off. The wetted charcoal was then dried for 3 hours at 110° C. The dried charcoal was found to contain 11 percent by weight potassium hydroxide. The activated charcoal was then oxidized at 650° C. as described above. A similar procedure was employed to prepare a sample of charcoal impregnated with potassium chloride.

TABLE I

| Run No. | Activated Charcoal Treatment | 300° C. | | 350° C. | | 400° C. | |
| --- | --- | --- | --- | --- | --- | --- | --- |
| | | Percent Dehydrochlorination | Wt. Percent Branched Chain | Percent Dehydrochlorination | Wt. Percent Branched Chain | Percent Dehydrochlorination | Wt. Percent Branched Chain |
| 1 | Air Oxidized Only | 99.1 | 10.1 | 98.9 | 10.2 | 99.1 | 11.8 |
| 2 | Air Oxidized after 10% KOH impregnation | 99.8 | 1.7 | 99.7 | 3.0 | Not measured | |
| 3 | Air Oxidized after 10% KCl impregnation | 98.3 | 2.7 | 99.9 | 4.4 | 99.9 | 5.9 |
| 4 | Air Oxidized after 1% KOH impregnation | 99.3 | 4.0 | 99.3 | 5.7 | 99.3 | 7.8 |
| 5 | Air Oxidized before 10% KOH impregnation | 99.9 | 2.1 | 99.3 | 3.5 | 99.0 | 6.0 |
| 6 | Air Oxidized before 10% KCl impregnation | 98.6 | 2.0 | 99.4 | 3.3 | 99.7 | 4.9 |

It can readily be seen from the results illustrated in the above table that the potassium-promoted charcoal catalysts of this invention are highly effective in providing high rates of dehydrohalogenation while minimizing isomerization. It can further be seen that the catalysts of our invention are highly superior to the non-promoted oxidized activated charcoal catalysts.

Various modifications of this invention can be made, or followed, in view of the foregoing, without departing from the spirit or scope thereof.

We claim:

1. A catalyst comprising a potassium compound and oxidized charcoal, said oxidized charcoal being produced by heating an activated charcoal in air above 300° C. for 1 second to 1 hour.

2. The catalyst of claim 1 wherein the quantity of potassium compound is in the range of 0.5 to 25 weight percent of said catalyst and said activated charcoal is heated in the range of 500° C. to 700° C. for 1 to 15 minutes.

3. The catalyst of claim 2 wherein said potassium compound is an inorganic potassium compound.

4. The catalyst of claim 2 wherein said potassium compound is potassium hydroxide.

5. The catalyst of claim 2 wherein said potassium compound is potassium chloride.

6. A process for producing olefins by the dehydrohalogenation of alkyl halides which comprises contacting said alkyl halide, in a reaction zone at a temperature in the range of 125 to 500° C., with a catalyst comprising oxidized charcoal, produced by heating an activated charcoal in air above 300° C. for a period of time ranging from 1 second to 1 hour, and a potassium compound.

7. The process of claim 6 wherein the quantity of said potassium compound is in the range of 0.5 to 25 weight percent of said catalyst.

8. The process of claim 6 wherein said alkyl halide comprises a straight chain alkyl halide.

9. A process for producing olefins by the dehydrohalogenation of alkyl halides which comprises contacting said alkyl halide in a reaction zone heated to a temperature in the range of 125 to 500° C. with a catalyst comprising oxidized charcoal, produced by heating an activated charcoal in air above 300° C. for a period of time ranging from 1 second to 1 hour, and an inorganic potassium compound, the quantity of said inorganic compound being in the range of 0.5 to 25 weight percent of said catalyst; withdrawing an effluent containing product olefins from said reaction zone; and separating said product olefins from said effluent.

10. The process of claim 9 to include separating unconverted alkyl halides from said effluent and recycling said separated alkyl halides to said reaction zone.

11. The process of claim 9 wherein said alkyl halide feed comprises a straight chain alkyl halide feed.

12. The process of claim 11 wherein said alkyl halide feed comprises a mixture of primary and secondary dodecyl chlorides and said inorganic potassium compound is potassium hydroxide.

13. The process of claim 11 wherein said alkyl halide feed comprises a mixture of primary and secondary dodecyl chlorides and said inorganic potassium compound is potassium chloride.

14. The process of claim 6 wherein said oxidized charcoal is heated in air at a temperature in the range of 500 to 700° C. for a period of time ranging from 1 to 15 minutes.

References Cited
UNITED STATES PATENTS

| | | | |
|---|---|---|---|
| 2,224,155 | 12/1940 | Kennedy et al. | 260—677 |
| 2,288,585 | 6/1942 | Baehr | 260—677 |
| 2,368,446 | 1/1945 | Buc | 260—677 |
| 2,389,231 | 11/1945 | Blumer | 260—680 |
| 3,240,834 | 3/1966 | Kruse et al. | 260—677 |

DELBERT E. GANTZ, *Primary Examiner.*

ALPHONSO D. SULLIVAN, *Examiner.*

J. D. MYERS, *Assistant Examiner.*